United States Patent [19]

Nielsen

[11] Patent Number: 5,169,612
[45] Date of Patent: Dec. 8, 1992

[54] PURIFICATION OF SULPHIDE-CONTAINING GASES

[75] Inventor: Poul E. H. Nielsen, Fredensborg, Denmark

[73] Assignee: Haldor Topsoe A/S, Denmark

[21] Appl. No.: 640,302

[22] PCT Filed: May 3, 1990

[86] PCT No.: PCT/DK90/00115

§ 371 Date: Jan. 25, 1991

§ 102(e) Date: Jan. 25, 1991

[87] PCT Pub. No.: WO90/14876

PCT Pub. Date: Dec. 13, 1990

[30] Foreign Application Priority Data

May 29, 1989 [DK] Denmark .................. 2608/89

[51] Int. Cl.$^5$ .................. C01B 17/16; C01B 31/00; B01J 23/00

[52] U.S. Cl. .................. 423/230; 423/563; 502/325; 502/345; 502/352

[58] Field of Search .......... 423/230, 231, 563, 566.1, 423/572; 502/310, 316, 338, 352, 325

[56] References Cited

U.S. PATENT DOCUMENTS

| 769,254 | 9/1904 | Currie | 423/563 |
|---|---|---|---|
| 1,682,240 | 8/1928 | Patrick | 502/352 |
| 3,745,194 | 7/1973 | Bertus et al. | 502/352 |
| 3,761,436 | 9/1973 | Hasimoto et al. | 502/352 |
| 4,155,990 | 5/1979 | Kimura et al. | 423/574 R |
| 4,478,800 | 10/1984 | van der Wal et al. | 423/230 |
| 4,946,820 | 8/1990 | Lane et al. | 502/352 |
| 4,971,940 | 11/1990 | Kaminsky et al. | 502/352 |

FOREIGN PATENT DOCUMENTS

| 3438770 | 4/1986 | Fed. Rep. of Germany . |
| 7103409 | 9/1971 | Netherlands .................. 502/352 |

OTHER PUBLICATIONS

Mantell, C. L., Tin, Its Mining Production, Technology & Application Acs Monograph 51, Chemical Book Co. NY, NY 1929, pp. 286–289, 314.

Primary Examiner—Gary P. Straub
Attorney, Agent, or Firm—Ostrolenk, Faber, Gerb & Soffen

[57] ABSTRACT

The removal of sulphides from gas streams while using a solid absorbent containing tin, tin oxides or mixtures thereof and optionally a stabilizing component consisting of nickel, copper, cobalt, iron or oxides thereof takes place by contacting the sulphide-containing gas stream with the solid absorbent, which is expediently in the form of a carrier with the tin component and the stabilizing component; hereby the absorbent is sulphided and the gas stream desulphided. Subsequently the sulphided absorbents are regenerated by being contacted with a stream of steam. The regeneration process employed is substantially thermoneutral so that superheating and consequent sintering of the absorbent is avoided; moreover it is not necessary to operate at low temperatures, whereby the formation of sulphates as a by-product is avoided.

7 Claims, No Drawings

PURIFICATION OF SULPHIDE-CONTAINING GASES

FIELD OF THE INVENTION

The present invention relates to a process for gas purification, and more particularly to a regenerative process for removal of gaseous sulphides in hot gas streams. The invention further relates to a solid absorbent for use in such process.

Industrial gases, such as feed gases for chemical synthesis or off-gases from plant operation, often contain high levels of sulphur compounds which were part of the feed stock. Removal of sulphur compounds from sulphur-containing gases is necessary to meet environmental quality standards or to avoid damage of equipment.

BACKGROUND OF THE INVENTION

Conventionally used solid absorbents in desulphurization processes are activated carbon, iron oxide and zinc oxide.

A solid acceptor comprising supported platinum group metals in association with copper, germanium, rhenium or tin compounds is mentioned in GB Patent No. 1,592,378. The acceptor as described is used in the separation of sulphur dioxide from a gaseous mixture containing sulphur dioxide and oxygen.

Sulphur in sulphur-containing fuel, however, is available in many processes as gaseous sulphides such as hydrogen sulphide, carbonyl sulphide and carbon disulphide or related compounds, such as mercaptans.

Removal of gaseous sulphide-compounds is usually achieved by cold scrubbing processes with liquid absorbents, such as alkanolamines.

The known scrubbing methods disadvantageously require cooling of treated gases, resulting in thermally less efficient processes.

Certain drawbacks of the known scrubbing processes can be avoided by the use of solid gas purification systems including the use of solid sulphide absorbents like metal oxides, which operate at higher temperatures.

A process for removing hydrogen sulphide from gases is mentioned in EP Application No. 159,05. By this process a hydrogen sulphide containing gas is contacted at a temperature above 300° C. with a solid absorbent comprising a mixture of zinc oxide and a zeolite. Spent absorbent is regenerated by passing an oxygen-containing gas over the absorbent at a temperature above 400° C.

Several other absorbents based on zinc oxide are described in the literature. Thus, zinc ferrite was recently proposed as absorbent of this type. Zinc ferrite ($ZnO.Fe_2O_3$) is a regenerative absorbent which works at high temperatures. During the gas desulphurization step the zinc and iron oxides are converted into the corresponding sulphides, which can be regenerated to the oxides by using oxidizing gases such as oxygen or air at elevated temperatures.

According to the following reactions:

$$ZnS + 3/2 O_2 \longrightarrow ZnO + SO_2(g); \Delta H = -105 \text{ kcal}$$

$$ZnS + 2 O_2 \longrightarrow ZnO + SO_3(g); \Delta H = -129 \text{ kcal}$$

the regeneration of ZnS is a highly exothermic reaction resulting in sintering of the absorption mass at elevated temperatures and in decreased desulphurization capacity of the absorbent caused by structural changes. To minimize sintering a proper control of the reaction temperature and atmosphere is necessary to stabilize the temperature within narrow ranges during the regeneration step. Lower temperatures, however, lead to a significant degree of zinc sulphate formation via the following reactions:

$$ZnS + 2 O_2 \rightarrow ZnSO_4$$

$$ZnO + SO_2 + \tfrac{1}{2} O_2 \rightarrow ZnSO_4.$$

This is deleterious to the overall process in that the presence of sulphates not only reduces the sulphur capacity of the sorbent but also leads to the introduction of $SO_2$ into the hot gas stream.

It is therefore an object of the present invention to provide a process for the purification of sulphide-containing gases without the disadvantages of the known processes.

According to the invention, there is provided a regenerative process for the removal of sulphides from a gas stream by using a solid absorbent comprising tin, tin oxides or mixtures thereof and optionally a stabilizing component, which process comprises the steps of contacting a sulphide-containing gas stream with the solid absorbent; sulphidizing the solid absorbent and desulphidizing the gas stream; and regenerating the sulphidized absorbent by contacting the sulphidized absorbent with a stream of steam.

In a preferred embodiment of the regenerative process according to the invention, the sulphide containing gas stream is contacted at a temperature of between 200° C. and 600° C. with the absorbent.

In a particularly preferred embodiment of the regenerative process according to the invention, the sulphidized absorbent is contacted at a temperature of between 300° C. and 500° C. with the stream of steam.

A further object of the present invention is to provide a regenerative absorbent for use in the process as described above, which absorbent comprises as absorption component at least one component selected from the group consisting of metallic tin, tin oxides and mixtures thereof.

In a preferred embodiment of the solid absorbent according to the invention the active absorption component is supported on a carrier material.

The carrier material for use in the inventive absorbent may be any known refractory materials which are stable at elevated temperatures. Suitable carrier materials are clays, silicates, alumina and titania.

Preferably, the carrier material is alumina or titania.

As tin is the active sulphide-capturing material the absorbent contains preferably at least 5% by weight of tin, tin oxides, or mixtures thereof.

In addition to the absorption component the solid absorbent according to the invention may further comprise a stabilizing component selected from group consisting of the oxides of copper, nickel, cobalt and iron.

The inclusion of the second component stabilizes the absorbent by forming an alloy with tin and thereby increasing the melting point of tin, which is formed during the purification of highly reducing gas mixtures.

A very dramatic raise of the melting point is seen in tin-iron alloys containing from 0.01 atom % to 20 atom % iron.

Accordingly, a particular preferred embodiment of the solid absorbent according to the invention comprises tin oxide as the active absorption component and from 0.01 atom % to 20 atom % of the active absorption component-iron or other stabilizing component.

According to the invention, the solid absorbent as mentioned hereinbefore may be prepared by any convenient method.

The absorbent is advantageously prepared by impregnating the carrier with an impregnation solution comprising the desired metal compounds and transforming the absorbent in a subsequent calcination step to its active form. Suitable tin salts for use in the impregnation solution are tin hydroxide and tin halogenides.

For the preparation of stabilized absorbents according to a preferred embodiment of the invention the impregnation solution further comprises salts of copper, nickel, cobolt or iron. Useful copper, nickel, cobalt and iron salts are any salts which by heating in a reducing atmosphere can be converted to their metallic form.

In a particularly preferred method the absorbent is prepared by pulverizing and intimately mixing particles of desired metal compounds and carrier material, succeeded by calcination to bring the absorbent in its active form for absorption of gaseous sulphides.

The activated absorbent may be used in any convenient shape, such es extrudates, tablets, pellets, granules, pills or powder.

In accordance with the inventive process the solid absorbent may be used in fixed bed manner in one or more reactors which operate alternatingly between absorption and regeneration phases. It may also be used in a fluidized bed and regenerated in a separator reactor.

During the absorption phase, sulphide-containing gases are passed through the reactor at a temperature between 200° C. and 600° C., as usually provided by the hot gases to be purified. Gaseous sulphides are thereby absorbed by tin and tin oxide according to one or more of the following reactions:

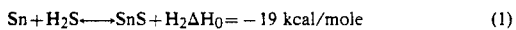
$$Sn + H_2S \longleftrightarrow SnS + H_2 \Delta H_0 = -19 \text{ kcal/mole} \tag{1}$$

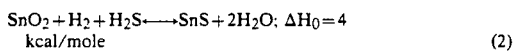
$$SnO_2 + H_2 + H_2S \longleftrightarrow SnS + 2H_2O; \ \Delta H_0 = 4 \text{ kcal/mole} \tag{2}$$

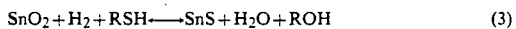
$$SnO_2 + H_2 + RSH \longleftrightarrow SnS + H_2O + ROH \tag{3}$$

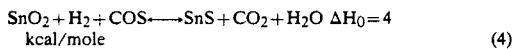
$$SnO_2 + H_2 + COS \longleftrightarrow SnS + CO_2 + H_2O \ \Delta H_0 = 4 \text{ kcal/mole} \tag{4}$$

Regeneration of spent absorbent is predominantly effected by the reversed and substantially thermoneutral reaction (2) by passing a stream of hot steam through the reactor during the regeneration phase.

Since the regeneration thereby proceeds by nearly thermoneutral reactions the temperature during the regeneration phase may vary within wide ranges.

The regeneration phase is advantageously carried out at temperatures between 300° C. and 500° C. though lower temperatures are permissible without any risk of sulphate formation.

Further advantages and objects of the invention will become obvious from the following not-limiting examples, which more fully illustrate the improvement in gaspurification as obtained by the preferred embodiments of the invention.

EXAMPLE 1

This example describes the preparation of a solid absorbent according to the invention comprising tin dioxide impregnated on alumina.

240 g of conventional alumina is suspended as 3 mm extrudates in an impregnation solution containing 40 g tin dichloride dihydrate ($SnCl_2, 2H_2O$) in 120 ml demineralized water.

The extrudates are allowed to stand in the impregnation solution at 20° C. for 15 minutes, after which the impregnated extrudates are filtered and dried at 110° C. for 16 hours.

The absorbent so formed is transformed to its active form containing 7.6 wt % tin by immersion in 200 ml of demineralized water having dissolved therein 40 g of sodium hydroxide at 20° C. for 15 minutes and subsequently calcination at 500° C. for one hour by which tin monoxide obtained by the reaction with sodium hydroxide is oxidized to tin dioxide.

EXAMPLE 2

In this example a method fo the preparation of a solid absorbent according to the invention is described.

130 g of the alumina described in Example 1 is suspended in 600 ml demineralized water and turbomixed at 20° C. After 30 minutes, 60 g of $SnO_2$ are added to the slurry. The turbomixing is continued for another 30 minutes, after which the slurry is dried at 110° C. for 16 hours.

The dried product, containing 14.9 wt % Sn, is mechanically ground and formed to tablets with a diameter of 4.5 mm and a height of 4.0 mm.

The tablets are finally calcinated at a temperature of about 400° C. for 1 hour.

EXAMPLE 3

The absorption capacity and regenerability of the absorbent as prepared in example 1 is evaluated in 3 subsequent absorption and regeneration cycles.

80 g of the absorbent is charged as a 400 mm high fixed bed in a tubular reactor with 18 mm inside diameter, provided with a 3 mm thermostate case. Feed gas comprising 66 vol % $H_2$
32 vol % CO
1 vol % $CO_2$
0.5 vol % $CH_4$ and
600–800 vol ppm $H_2S$ is generated by cracking methanol and ammonium sulphide. The content of hydrogen sulphide in the feed gas is continuously analyzed by means of a Dräger ® tube at the inlet and outlet side of the reactor.

The gas flow into and out of the reactor is measured by means of a conventional dry gas metering apparatus.

During the absorption phases feed gas comprising about 15 vol % water vapour is passed through the reactor at a space velocity between 250 and 420 Nl/h and a temperature between 365° and 472° C. as specified below.

The breakthrough time is determined graphically when the content of $H_2S$ in the outlet gas of the reactor increases abruptly in a given time interval between two $H_2S$-analyses.

Regeneration of spent absorbent is commenced after 17 hours, 300 minutes and 270 minutes of the first, second the third absorption phase, respectively.

At the regeneration phase steam is passed through the reactor at a space velocity of 521 Nl/h and a temperature between 370° and 450° C. for 525 minutes, 480 minutes and 350 minutes of the first, second and third regeneration, respectively.

During the regeneration the content of desorbed $H_2S$ in the outlet gas from the reactor is continuously measured by means of a Dräger ® tube. The process parameters and the results of the absorption and regeneration tests are tabulated below in Table 1.

130 g of alumina extrudates, as described in Example 1, are suspended in 600 ml demin. water and turbomixed at 20° C. for 15 min. 60 g of $SnO_2$ are added and turbomixing is continued at 20° C. for another 15 min. after which 8.2 g of $Fe_2O_3$ are added.

TABLE 1

|  | Temp., °C. | Pressure, bar | Flow inlet, Nl/h | $H_2S$, inlet/outlet, before breakthrough ppm | Absorption efficiency, % $H_2S$ absorbed | Breakthrough time, min. | Load at breakthrough, mol $H_2S$ per mol $SnO_2$ | Regeneration efficiency, mol desorbed $H_2S$ per mol absorbed $H_2S$ |
|---|---|---|---|---|---|---|---|---|
| 1st absorption | 368–415 | 25 | 252 | 800/30 | 96.3 | 210 | 0.73 | |
| 1st regeneration | 367–404 | 10 | 521 | | | | | 0.97 |
| 2nd absorption | 365–412 | 26 | 419 | 650/17 | 97.4 | 180 | 0.74 | |
| 2nd regeneration | 376–404 | 10 | 521 | | | | | 0.84 |
| 3rd absorption | 408–472 | 25 | 420 | 660/90 | 85.0 | 180 | 0.73 | |
| 3rd regeneration | 388–443 | 10 | 521 | | | | | 0.92 |

The data of table 1 clearly show that the absorption efficiency of this absorbent is nearly constant within a wide range of operation conditions.

EXAMPLE 4

A preferred embodiment of the invention is related to a stabilized solid absorbent comprising tin dioxide and nickel oxide.

130 g af alumina extrudates, as described in Example 1, are suspended in 600 ml demin. water and turbomixed at 20° C. for 15 minutes. 60 g of $SnO_2$ are added and turbomixing is continued at 20° C. for another 15 minutes after which 12.3 g of basic nickel carbonate ($NiCO_3.2Ni(OH)_2.4H_2O$) are added.

The slurry is maintained at 20° C. and turbomixed for additional 30 minutes.

The mixture formed is dried at 110° C. for 126 hours.

The dried product containing 24.0 wt % Sn and 2.9 wt % Ni is mechanically ground and formed to tablets with a diameter of 4.5 mm and a height of 4.0 mm.

The tablets are finally calcined at a temperature of about 400° C. for 1 hour, which leaves the absorbent in its active form.

EXAMPLES 5–6

In the preparation of a solid absorbent representative of other stabilized absorbents according to the invention basic nickel carbonate is replaced by basic copper carbonate ($2CuCO_3.CU(OH)_2$) or basic cobalt carbonate ($2CoCO_3.Co(OH)_2.H_2O$), and the preparation is carried out in substantially the same manner as described in Example 4.

EXAMPLE 7

In this Example the preparation of a particularly preferred stabilized absorbent comprising iron as stabilizing component is described.

The slurry is maintained at 20° C. and turbomixed for additional 30 min.

The mixture formed is dried at 110° C. for 16 hours.

The dried product containing 23.8 wt % Sn and 2.9 wt % Fe is mechanically gorund and formed to tablets with a diameter of 4.5 mm and a height of 4.0 mm.

The tablets are finally calcined at a temperature of about 400° C. for 1 hour.

EXAMPLE 8

The absorption capacity and regenerability of the copper stabilized absorbent prepared in Example 5 is evaluated by 6 subsequent absorption and regeneration cycles by the procedure described in Example 3.

92.7 g of the absorbent comprising 0.19 mol % Sn and 0.04 mol % Cu, calculated on the total amount of the absorbent, are charged in the reactor.

The flow of feed gas comprising about 15 vol % water vapour through the rector at the absorption phase is measured continuously and varies between 340 and 505 Nl/h at a temperature between 400° and 510° C.

During the absorption phases the content of $H_2$ and $H_2S$ in the feed gas varies as summarized in Table 2 below.

TABLE 2

| | Absorption No. | | | | | |
|---|---|---|---|---|---|---|
| | 1 | 2 | 3 | 4 | 5 | 6 |
| vol % $H_2$ | 66 | 66 | 72 | 72 | 72 | 72 |
| vol % CO | 32 | 32 | 14 | 14 | 14 | 12 |
| vol % $CO_2$ | 1 | 1 | 13 | 13 | 13 | 15 |
| vol % $CH_4$ | 0.5 | 0.5 | 0.2 | 0.2 | 0.2 | 0.6 |
| vol ppm $H_2S$ | 750 | 3600 | 4000 | 3700 | 4900 | 8800 |

During the regeneration phase steam is passed through the reactor at a space velocity of about 250–530 Nl/h and a temperature of 350°–560° C. as further specified in Table 3.

TABLE 3

| | Time min. | Temp., °C. | Pressure, bar | Flow inlet Nl/h | $H_2S$, inlet/outlet, before breakthrough ppm | Absorption efficiency, % $H_2S$ absorbed | Breakthrough time, min. | Load at breakthrough, mol $H_2S$ per mol $SnO_2$ | Regeneration efficiency, mol absorbed $H_2S$ per mol desorbed $H_2S$ | Corrected for $H_2S$ dissolved in $H_2O$ |
|---|---|---|---|---|---|---|---|---|---|---|
| 1st absorption | 1370 | 364–412 | 25 | 340 | 750/26 | 96.5 | 940 | 0.72 | | |
| 1st regeneration | 745 | 342–391 | 10 | 521 | | | | | 0.83 | 1.0 |
| 2nd absorption | 1150 | 357–405 | 25 | 355–403 | 3600/65 | 98.2 | 945 | 1.32 | | |
| 2nd regeneration | 1575 | 349–393 | 10 | 524 | | | | | * | |
| 3rd absorption | 310 | 363–401 | 25 | 406 | 4000/200 | 95.0 | 90 | 1.95 | | |
| 3rd regeneration | 1410 | 352–394 | 10 | 526 | | | | | * | |

TABLE 3-continued

|  | Time min. | Temp., °C. | Pressure, bar | Flow inlet Nl/h | H$_2$S, inlet/ outlet, before breakthrough ppm | Absorption efficiency, % H$_2$S absorbed | Breakthrough, time, min. | Load at breakthrough, mol H$_2$S per mol SnO$_2$ | Regeneration efficiency, mol absorbed H$_2$S per mol desorbed H$_2$S | Corrected for H$_2$S dissolved in H$_2$O |
|---|---|---|---|---|---|---|---|---|---|---|
| 4th absorption | 440 | 407–457 | 25 | 405 | 3700/190 | 94.8 | 100 | 0.95 | | |
| 4th regeneration | 450 | 391–446 | 10 | 523 | | | | | 0.83 | 1.0 |
| 5th absorption | 195 | 407–457 | 25 | 409 | 4900/230 | 95.3 | 100 | 1.05 | 0.75 | 1.0 |
| 5th regeneration | 425 | 392–447 | 10 | 521 | | | | | | |
| 6th absorption | 245 | 423–459 | 25 | 195 | 8800/230 | 97.4 | 120 | | | |
| 6th regeneration | 450 | 409–450 | 10 | 256 | | | | | 0.88 | 1.0 |

*missing values

I claim:

1. A process for the removal of sulphides from a sulphide-containing gas stream comprising contacting said stream with a solid absorbent containing tin oxides and a stabilizing component which forms an alloy with tin having a higher melting point than tin, thereby sulphidizing said solid absorbent and desulphidizing said gas stream; and regenerating the sulphidized absorbent by contracting it with steam as the sole regenerative agent.

2. The process as claimed in claim 1, wherein the sulphidized absorbent is contacted at a temperature of between 300° C. and 500° C. with the steam.

3. The process as claimed in claim 1, wherein said stabilizing component constitutes from 0.01 atom % to 20 atom % of the tin oxides +the stabilizing component.

4. The process as claimed in claim 1, wherein said stabilizing component is selected from the group consisting of copper, nickel, cobalt, iron and oxides thereof.

5. The process as claimed in claim 4, wherein said stabilizing component is iron oxide.

6. The process as claimed in claim 1, wherein said oxides and said stabilizing component are supported on a carrier material.

7. The process as claimed in claim 1, wherein said carrier material is selected from the group consisting of alumina and titania.

* * * * *